United States Patent [19]

Waldmann et al.

[11] Patent Number: 4,559,994
[45] Date of Patent: Dec. 24, 1985

[54] PASSENGER VEHICLE HEAT EXCHANGER ARRANGEMENT

[75] Inventors: Heinrich Waldmann, Stuttgart; Prasanta Halder, Ditzingen; Wolfgang Volz, Magstadt; Albert Stolz, Tübingen, all of Fed. Rep. of Germany

[73] Assignee: Süddeutsche Kühlerfabrik Julius Fr. Behr GmbH & Co. KG, Fed. Rep. of Germany

[21] Appl. No.: 611,215

[22] Filed: May 17, 1984

[30] Foreign Application Priority Data

May 18, 1983 [DE] Fed. Rep. of Germany ....... 3317983
May 18, 1983 [DE] Fed. Rep. of Germany ....... 3317982

[51] Int. Cl.$^4$ .......................... F28D 1/04; F28D 7/08; F28F 9/26
[52] U.S. Cl. ...................................... 165/41; 165/151; 165/144; 165/176; 165/135; 237/12.3 B
[58] Field of Search ............... 165/151, 176, 135, 146, 165/139, 127, 22, 144, 145, 41; 237/12.3 B

[56] References Cited

U.S. PATENT DOCUMENTS

| 1,910,401 | 5/1933 | Mueller | 237/12.3 B |
| 1,992,130 | 2/1935 | Rose | 165/151 |
| 1,993,095 | 3/1935 | Heinrich | 165/139 |
| 2,051,402 | 8/1936 | Bappler | 165/151 |
| 2,132,045 | 10/1938 | Payne | 165/127 |
| 2,699,323 | 1/1955 | Bergstrom | 165/41 |

FOREIGN PATENT DOCUMENTS

| 1551509 | 1/1967 | Fed. Rep. of Germany . | |
| 2139364 | 2/1973 | Fed. Rep. of Germany | 165/176 |
| 2304832 | 8/1974 | Fed. Rep. of Germany | 165/144 |
| 0167279 | 5/1934 | Switzerland | 165/127 |
| 1016043 | 1/1966 | United Kingdom | 165/41 |

Primary Examiner—Albert W. Davis, Jr.
Assistant Examiner—John K. Ford
Attorney, Agent, or Firm—Barnes & Thornburg

[57] ABSTRACT

A motor vehicle heat exchanger for independently heating different passenger areas comprising first and second tube/fin block units for transferring heat from coolant flowing through tubes thereof to air flowing therethrough to first and second passenger areas, respectively. Common upper and lower coolant reservoir tanks supply coolant to both tube/fin units and receive coolant returning therefrom respectively. Intake tubes extend through a common gap between the first and second tube/fin units to supply heated coolant to the lower cooling tank.

19 Claims, 7 Drawing Figures

PASSENGER VEHICLE HEAT EXCHANGER ARRANGEMENT

BACKGROUND AND SUMMARY OF THE INVENTION

The invention relates to a heat exchanger arrangement, especially for the independent heating of the driver and passenger sides of a passenger compartment of a motor vehicle.

The invention is especially concerned with heat exchanger arrangements of the type including two tube/fin heat exchanger block units separated from one another, but arranged at common upper and lower liquid cooling (e.g., water) boxes or tanks. The tube/fin heat exchanger block units include a plurality of fins extending perpendicular to the tubes, whereby heat exchange between air flowing past the tubes and fins and the water in the tubes takes place. Water intake and return connectors are arranged at the respective tanks.

Heat exchangers are disclosed in DE OS (German Published Unexamined Application) No. 15 51 509 including two separate heat exchange circuits passing through a common heat exchanger. In order to prevent the interference of the one heat exchange circuit by the other, the heat exchange fins of the two heat exchange circuits are separated from each other by means of a gap, which gap is formed respectively by means of slots in the fin bodies, which slots are stacked with respect to each other to compose a unit. Such heat exchangers have the disadvantage that to a certain degree the mutual interference of both heat exchanger circuits can not be prevented. It is further disadvantageous that the heat exchanger in this arrangement includes only one pipe being passed through by the heat medium, which in turn has to be connected with the heat circulation at both of its sides. The same is true if said heat exchangers are supplied with several pipes.

There are other known heat exchangers of the above mentioned type which, however, are attached only by one side with the connectors due to structural reasons. Both the intake and return connectors are then arranged at the upper water box, and the intake pipes or tubes extend downward from respective regions of the upper water box divided by separating walls to the lower water box within the common intermediate space of the heat exchangers. However, these constructions display the same disadvantages of mutual interference of heat exchange circulations.

It is therefore an object of this invention to reduce the thermal interference between the heat exchange circuits. The invention provides, in connection with a heat exchanger of the type described above, that the intake pipes extend parallel to each other to the lower water box without touching the fins. This contactless feature is obtained according to preferred embodiments by providing that the passage openings of the intake pipes which are arranged in the fins and within the common intermediate space, are of a greater diameter than the intake pipes themselves. These embodiments have the advantage that the compact structure of the fin blocks is retained and common tooling can be utilized for the manufacture of the heat exchanger. The cooler region return tubes at the upper water box are influenced only very little by the same areas of the hot intake pipes, since the same do not come in contact with the heat exchange fins.

However, it is also contemplated to form the intermediate area as a gap between partitioning walls which are provided at the edges of the fins or fin blocks at the respective heat exchange circuit units facing one another. Such partitioning walls are produced according to especially preferred embodiments by adjoining fins having edges bent to one side and which overlap each other like roof shingles. This embodiment exhibits the advantage that the intake pipe are entirely separated from the fins. In order to avoid the heating up of the air stream flowing past the intake pipes, so that such heated air stream transfers heat to the fins or the partitioning walls, it is advantageous to provide the common intermediate space with a covering means facing the side exposed to the air stream flow. The gap between the partitioning walls of the fins or these areas containing the intake pipes which areas are covered towards the air intake side, is to be chosen as small as possible in order not to reduce the heat exchange surface unnecessarily. In this connection combinations are also contemplated with intake pipes which extend by means of passage openings having a greater diameter in the area of the fin ends. Thereby the area without fins and also not participating in the heat exchange, between the separated heat exchanger units, is selected as small as possible without however, excessively increasing the danger of heat interference by increase of the intake pipes.

The cover provided along the side of the intermediate gap area of intake tubes, and being exposed to the air stream, is fixedly attached to the intake pipes in a very simple manner. In the embodiments where the intake pipes extend within the intermediate gap in between the fin blocks, the cover or mantel piece preferably is formed of a plate or panel corresponding in size to the height of the pipe fin blocks, including protruding latches at the intake pipes which are advantageously arranged to allow a lateral sliding and locking.

In order to keep the space requirement for the intake connection between upper and lower water boxes as small as possible, so that the heat exchange between the adjoining pipe fin blocks is kept to a minimum with the smallest possible work space, a further advantageous feature of the invention is to provide the intake pipes with a greater cross-section (diameter) than the return pipes of the fin blocks. This embodiment advantageously maintains the compact structure of the tube fin blocks. The common intermediate gap between the pipe fin blocks which is formed by adjoining fins having edges bent to one side and which overlap each other like roof shingles has the advantage that wider intake pipes extend entirely separate from the fins.

By utilizing this embodiment it becomes possible to arrange two intake pipes one after the other in the air stream direction, because the cross-section of the flow is adjusted to the total cross-section of the return flow. Thereby, the gap between the pipe fin blocks is minimized to an optimum. This gap is then closed, by means of a cover piece, towards the direction of air flow, thereby eliminating an interference of the two pipe fin blocks by the air stream which is heated up along the intake pipes.

Further objects, features, and advantages of the present invention will become more apparent from the following description when taken with the accompanying drawings which show, for purposes of illustration only, embodiments in accordance with the present invention.

DETAILED DESCRIPTION OF THE DRAWINGS

Figure 1:
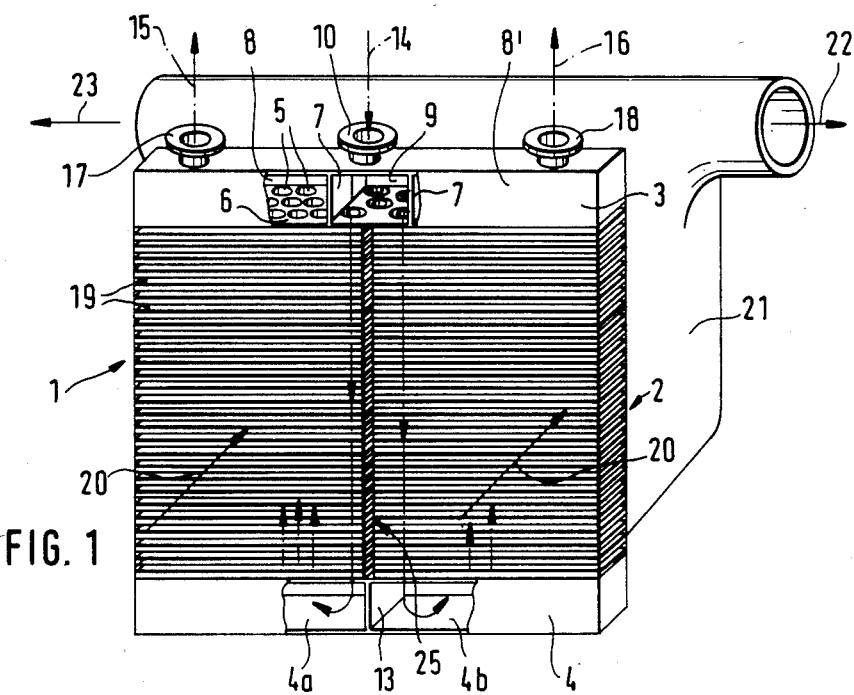
FIG. 1 is a perspective view of a water-air heat exchanger for accomodating separate heating of both sides of a motor vehicle passenger compartment constructed in accordance with a preferred embodiment of the invention.
Figure 2:
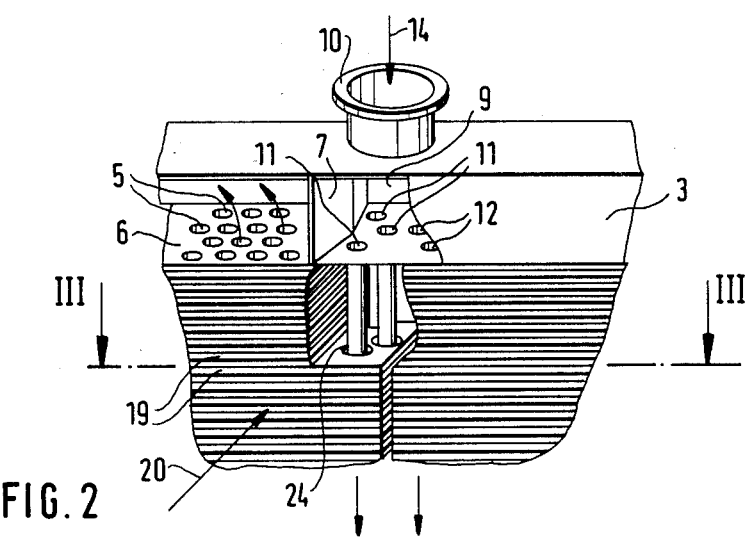
FIG. 2 is an enlarged partial sectional/opened view of the region of the heat exchanger of FIG. 1 for accomodating entry of engine coolant which serves as the heat medium.

FIGS. 1 and 2 schematically depict a heat exchanger arrangement including two independent pipe or tube/fin blocks 1 and 2 of a known construction, which are, however, arranged at a common upper water box 3 and a common lower water box 4. The tube/fin blocks 1 and 2 thereby consist of several tubes 5 extending parallel to each other and extending from the upper water box 3 to the lower water box 4. Only the upper connecting sleeve parts of tubes 5 are shown in these figures. These connecting sleeves are tightly inserted into the bottom 6 of the upper water box 3. The upper water box 3 is divided into two lateral spaces 8, 8' by partition walls, 7, in between which a clearance or gap 9 is provided to serve together with an inlet connector sleeve 10, as a coupling to a heating medium which, in the present embodiment, is a connection to the engine coolant. Some of the tubes, namely tubes 11 and 12, are connected to the bottom 6 of the upper water box 3 in the area of gap 9. These tubes 11 and 12 which are connected to bottom 6 of upper water box 3 end in the area of gap 9 serve as intake tubes for the hot water. Intake tubes 11 end in the left chamber 4a of the lower water tank 4 while the intake tubes 12 end in the right chamber 4b of the lower water tank 4. The two chambers 4a and 4b are separated by means of a partitioning wall 13. The in-flowing hot water through the connector 10 is thereby divided into two streams, the one passing through tube 11 to tube/fin block 1 and the other through tube 12 to tube/fin block 2. The intake water supplied corresponding to arrow 14 is thereby divided into two water flows 15 and 16 that exit through the return connecting sleeves 17 and 18 in the upward direction as indicated by arrows. Both tube/fin blocks 1 and 2 are themselves constructed in a known manner from tubes 5 extending parallel to each other, these tubes being respectively connected by means of plate-like fins 19 positioned perpendicularly thereto. Air flows in direction 20 through the tube/fin blocks 1 and 2 and is divided by means of a control device 21 behind the heat exchange units respectively into two air streams 22 and 23 which are heated up differently depending on the control of water flow through the tube fin blocks 1 and 2. A modification of the present invention would be to provide two separate supply sleeves 10 for the intake instead of only one, so as to enable control of the amount of heat medium when already supplied and would eliminate a mutual interference of the heat medium amount at the intake side. A further modification is to control the heating up by controlling the amount of air flow. These control features are not required for practicing the present invention although such arrangements are contemplated.

Figure 3:
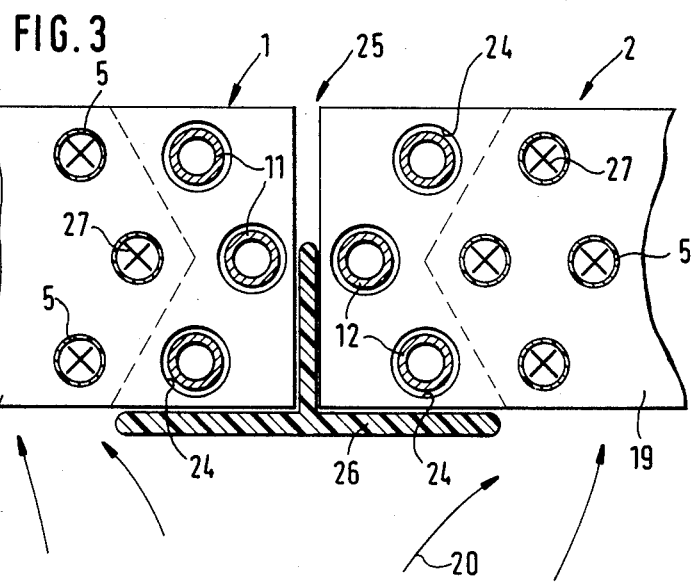
FIG. 3 is a schematic, enlarged partial view of a cross-sectional view along line III—III of FIG. 2.

In order to avoid the transfer of heat from the hot intake tubes in the upper area of tube/fin blocks 1 and 2 to the fins 19 and thereby to the air flow 20, the intake tubes 11 and 12 are so designed, as can be seen from FIG. 2, that they extend through fins 19 essentially in the same manner as tubes 5. However, the passage openings 24 for tubes 11 and 12 have a greater diameter than tubes 11 and 12. Tubes 11 and 12 then extend without touching through the intermediate region in the center of the two tube/fin bodies or blocks 1 and 2. Tubes 11 and 12 are thus unable then to expend any heat by contact with the fins due to the insulating effect of the air gap between the tubes and the fins 19. Because there is yet some heat exchange interference caused by the air 20 passing through the heat exchanger thereby taking in the heat of intake tubes 11 and 12 and passing it on to fins 19, preferred embodiments of the invention provide for a cover 26 at the intermediate region 25 wherein intake tubes 11 and 12 separate the tube/fin bodies 1 and 2 in accordance with FIG. 3. FIG. 3 furthermore illustrates turbulance control elements 27 for the return tubes 5 while the intake tubes 11 and 12 do not contain such turbulance control elements. The flow resistance of return tubes 5 is thereby essentially greater than in the case of the intake tubes 11 and 12 so that fewer intake tubes are required as compared to the number of return tubes. The turbulance elements 27 further serve in a known manner to better control the heat exchange transfer from the return tubes 5 to fins 19 and thereby to the through flowing air.

With the embodiment of FIG. 3, as shown by arrows 20, an air flow within the intermediate region 25 is almost eliminated. The undesirable interference of a temperature difference occuring within the tube/fin bodies 1 and 2 from the bottom to the top and a mutual interference of the two heat exchange circulations is thereby also avoided.

Figure 4:
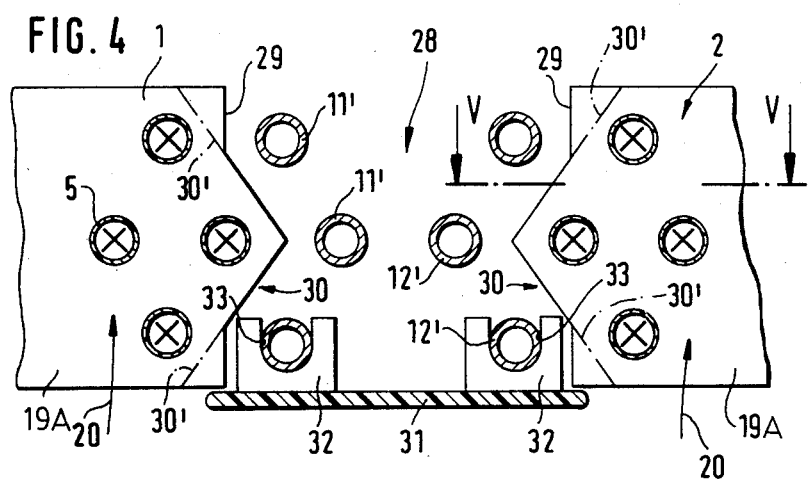
FIG. 4 is a cross-sectional view similar to FIG. 3, but pertaining to another preferred embodiment of the invention.
Figure 5:
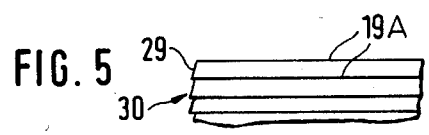
FIG. 5 is a schematic cross-sectional view along line V—V of FIG. 4.

FIG. 4 shows another preferred embodiment whereby the intake tubes 11' and 12' are not extending through recesses in fins 19A but rather through a gap or clearance 28 between the outer edges 29 of fins 19A of the two tube/fin bodies 1 and 2, which edges 29 face each other respectively. The fins 19A are, as FIG. 5 shows, folded or bent at one side in such a manner that the outer edges 29 of the two adjoining fins 19A overlap each other like roof shingles. Thereby effectively continuous partitioning walls 30 are attained on both sides of groove 29 which prevent the passage of air in the direction of arrows 20 from the area between fins 19A into the gap or clearance 28. The gap can include again a cover 31 at the side exposed to the air stream, which is composed of protruding latches 32 with recesses 33 attachable in a simple manner to the intake tubes 11' or 12' respectively. If the cover element 31 is formed in the shape of a plate from the height of tube fin bodies 1 or 2, the entire gap (clearance) 28 is then covered against any air flow. Therefore, intake tubes 11' or 12' are unable to influence the temperature of both heat exchange bodies. The partitioning walls 30 can be in the form as described in FIG. 4 namely having a strong extractive course. They can also, however, be composed according to other preferred embodiments, of two partial walls joining together in an angle as indicated by dotted lines 30′. The manufacturing process for such fin outer edges is thus straightforward with cover 31 designed correspondingly larger.

Figure 6:
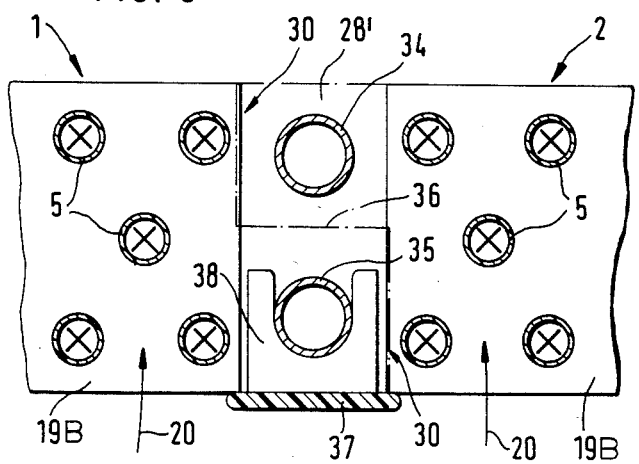
FIG. 6 is a cross-sectional view similar to FIG. 3 but of a yet another preferred embodiment of the invention having intake pipes having a large diameter.

FIG. 6 shows an embodiment wherein intake tubes 34 and 35 (instead of tubes 11 or 11′ and 12, 12′) have different diameters than the tubes 5. Here, the intake means consist of two tubes 34 and 35 having a much greater cross section than the return tubes and whereby one is connected, for example, to a partial chamber similar to chamber 4a of the water tank 4 in FIG. 1 and the other likewise to chamber 4b. This separation can also be attained with a partitioning wall 36 extending Z-shaped as shown outlined by dotted lines. This wall 36 has a wall portion extending laterally to direction 20 of the air flow between intake tubes 34 and 35, permitting arrangement of the two intake tubes 34 and 35 one behind the other in direction of the passing air flow 20, yet resulting in two separate heat circulations. This embodiment includes fins 19B again having outer edges like edges 29 in accordance with FIG. 5, thereby obtaining a gap or clearance 28′ between the two tube/fin bodies 1 and 2 with partitioning walls 30 extending parallel towards each other. This gap 28′ can include a cover element 37 at the side exposed to the air flow, which cover is designed similar to cover 31 and is connected by means of a clipped-on latch 38 with the front intake tube 35. The cross sections of intake tubes 34 and 35, having a larger diameter, are adapted to the total cross sections of return tubes 5.

Figure 7:
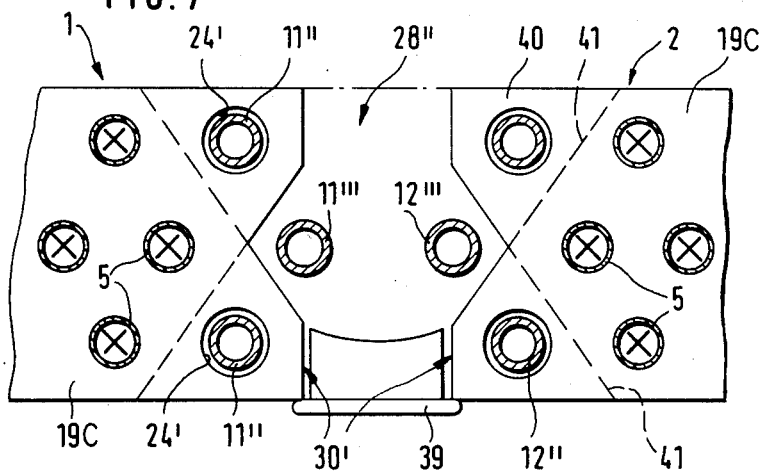
FIG. 7 is a cross-sectional view similar to FIG. 3, but of still another preferred embodiment of the invention.

FIG. 7 shows an embodiment having a combination of the features of the embodiments of FIGS. 3 and 4. Some of the intake tubes 11″ here are passed through vent openings 24′ having a greater diameter in fins 19C. Some other, namely intake tubes 11‴ and 12‴, extend freely within gap 28″ formed between the partitioning walls 30′, which here are constructed in part of partitions parallel to each other and for the other part of partitions at an angle to each other. A cover element 39 prevents the air flow through gap 28″. With this embodiment, the surface responsible for the heat exchange is enlarged respectively by the flow areas 40 as compared to the heat exchange surface of the FIG. 4 embodiment. Area 40 is designated by the partitioning wall 30′ and the dotted line 41 which corresponds to the wall 30 of the FIG. 4 embodiment.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A heat exchanger arrangement for the independent heating of two passenger areas of a motor vehicle passenger compartment comprising:
   a first tube and fin block unit for transferring heat between air flowing therethrough and coolant flowing in the tubes thereof to control heating of air for one of said passenger areas,
   a second tube and fin block unit for transferring heat between air flowing therethrough and coolant flowing in the tubes thereof to control heating of air for the other of said passenger areas,
   common upper and lower coolant tanks for communicating coolant to and from both of said first and second tube and fin block units, and
   intake tube means for supplying heated coolant to the lower coolant tank, said intake tube means extending from the upper tank to the lower tank in a common intermediate thermal gap area formed between the first and second tube and fin block units, said intake tube means extending through the fins of said units without contacting said fins so that conductive heat transfer from the intake tube means to the fins of said first and second tube and fin block units is generally avoided.

2. An arrangement according to claim 1, wherein said upper coolant tank includes partitioning walls separating an inlet area opening into the intake tube means and respective outlet areas at the upper side of the two tube and fin block units.

3. An arrangement according to claim 2, wherein said lower coolant tank is separted into respective tank compartments for the two tube and fin block units.

4. An arrangement according to claim 3, wherein the fins of the tube and fin block units extend into the common intermediate thermal gap and include through openings for the intake tube means said openings having a greater diameter than said intake tube means so there is an air gap clearance between said fins and the intake tube means.

5. An arrangement according to claim 3, wherein the common intermediate thermal gap is a gap between partitioning walls which are provided at the edges of the fins facing each other of both tube and fin block units.

6. An arrangement according to claim 5, wherein the partitioning walls are composed of shingle-like, overlapping shaped edges of adjacent fins of the tube and fin block units.

7. An arrangement according to claim 1, wherein the common intermediate thermal gap is covered by a cover element at the side facing the air flow through the two tube and fin block units.

8. An arrangement according to claim 5, wherein the common intermediate thermal gap is covered by a cover element at the side facing the air flow through the two tube and fin block units.

9. An arrangement according to claim 7, wherein the cover element is arranged at the side of the gap which is exposed to the air flow and is attached to at least one of the intake tube means.

10. An arrangement according to claim 9, wherein the cover element consists of a plate with a height extending over tube and fin block units and exhibits protruding latches attachable to the intake tube means.

11. An arrangement according to claim 10, wherein the latches are composed of an elastic material and contain recesses opened at one side, which are slid onto the intake tube means to be fixedly attached thereto.

12. An arrangement according to claim 3, wherein the intake tube means are tubes of the same diameter as the tubes of the respective tube and fin block units.

13. An arrangement according to claim 3, wherein the intake tube means are tubes of a greater diameter than the tubes of the respective tube and fin block units.

14. An arrangement according to claim 13, wherein only two of the tubes of the intake tube means are provided and they are of the same diameter and are arranged one behind each other in the direction of air flow in the common intermediate thermal gap area, whereby a partitioning wall in the lower tank extends laterally to the gap between the two tubes of the intake tube means.

15. An arrangement according to claim 14, wherein the thermal gap is delimited by partitioning walls which themselves are composed of shingle-like edges, overlapping sloped edges of adjacent fins of the tube and fin block units.

16. An arrangement according to claim 13, wherein a cover element is provided at the side of the gap thermal exposed to the air flow which cover is attached by means of protruding latches to the tubes of the intake tube means.

17. An arrangement according to claim 15, wherein a cover element is provided at the side of the thermal gap exposed to the air flow which cover is attached by means of protruding latches to the tubes of the intake tube means.

18. A heat exchanger arrangement for the independent heating of two passenger areas of a motor vehicle passenger compartment comprising:
   a first tube and fin block unit for transferring heat between air flowing therethrough and coolant flowing in the tubes thereof to control heating of air for one of said passenger areas,
   a second tube and fin block unit for transferring heat between air flowing therethrough and coolant flowing in the tubes thereof to control heating of air for the other of said passenger areas,
   common upper and lower coolant tanks for communicating coolant to and from both of said first and second tube and fin block units, and
   intake tube means for supplying heated coolant to the lower coolant tank, said intake tube means extending from the upper tank to the lower tank in an intermediate thermal gap area formed between the first and second tube and fin block units, said intake tube means extending through the fins of said units without contacting said fins, wherein the fins of the tube and fin block units extend into the common intermediate thermal gap and include through openings for the intake tubes, said openings having a greater diameter than said intake tube means so there is an air gap claarance between said fins and the intake tube means.

19. A heat exchanger arrangement for the independent heating of two passenger areas of a motor vehicle passenger compartment comprising:
   a first tube and fin block unit for transferring heat between air flowing therethrough and coolant flowing in the tubes thereof to control heating of air for one of said passenger areas,
   a second tube and fin block unit for transferring heat between air flowing therethrough and coolant flowing in the tubes thereof to control heating of air for the other of said passenger areas, the first and second tube and fin block units being fixed in spaced-apart relation to define an intermediate thermal gap area therebetween so that conductive heat transfer from one tube and fin block unit to another tube and fin block unit is avoided,
   common upper and lower coolant tanks for communicating coolant to and from both of said first and second tube and fin block units, and
   intake tube means for supplying heated coolant to the lower coolant tank, said intake tube means extending from the upper tank to the lower tank in the intermediate thermal gap area formed between the first and second tube and fin block units, said intake tube means extending through the fins of said units without contacting said fins.

* * * * *

UNITED STATES PATENT AND TRADEMARK OFFICE
CERTIFICATE OF CORRECTION

PATENT NO. : 4,559,994
DATED : December 24, 1985
INVENTOR(S) : Heinrich Waldmann, et al.

It is certified that error appears in the above-identified patent and that said Letters Patent is hereby corrected as shown below:

On the title page:

[73] Assignees: Süddeutsche Kühlerfabrik Julius Fr. Behr GmbH & Co. KG, Fed. Rep. of Germany, AND -- Daimler-Benz Aktiengesellschaft of Fed. Rep. of Germany --

Signed and Sealed this

Seventeenth Day of June 1986

[SEAL]

Attest:

DONALD J. QUIGG

Attesting Officer

Commissioner of Patents and Trademarks